O. HEINS.
MAGNETO ELECTRIC MACHINE.
APPLICATION FILED JAN. 22, 1915.
1,165,596.
Patented Dec. 28, 1915.
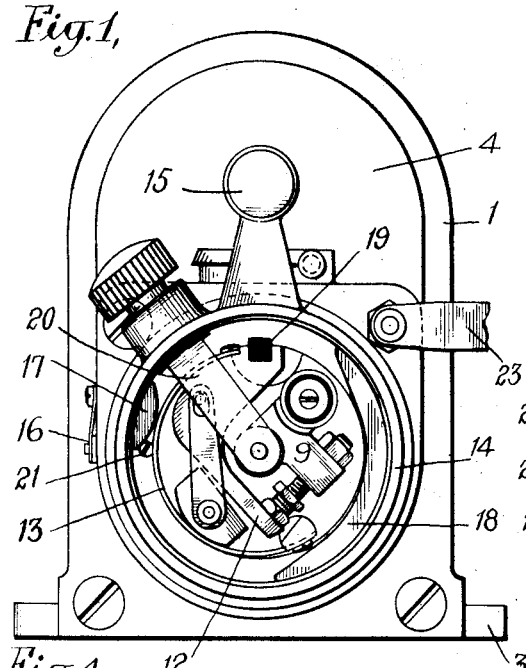
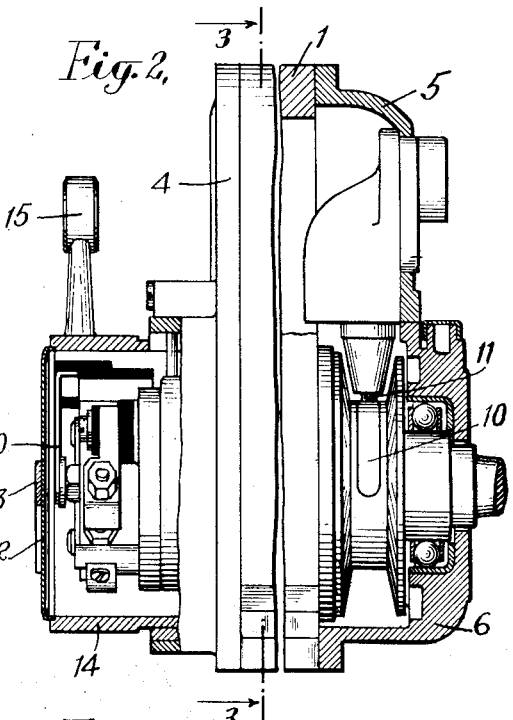
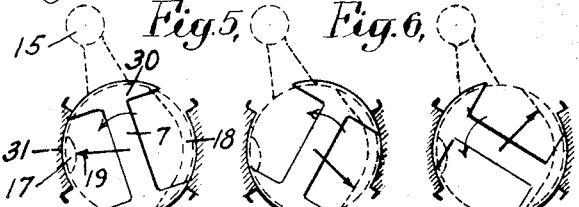
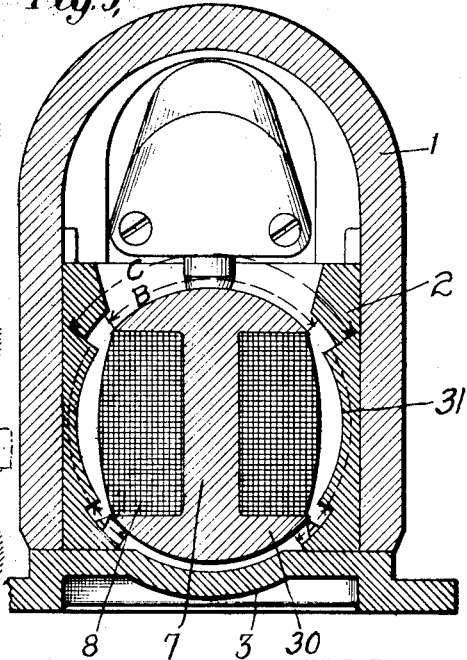
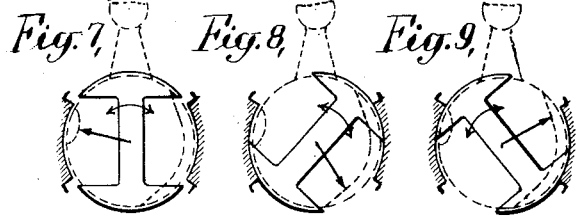
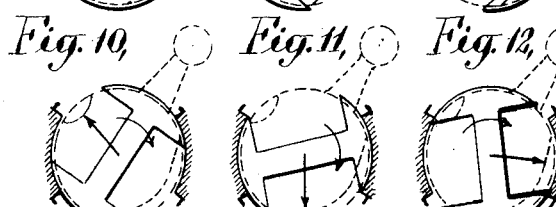
WITNESSES:
E. Nathan
M. Ames
INVENTOR
Otto Heins
BY
ATTORNEYS

UNITED STATES PATENT OFFICE.

OTTO HEINS, OF NEW YORK, N. Y., ASSIGNOR TO BOSCH MAGNETO COMPANY, OF NEW YORK, N. Y., A CORPORATION OF NEW YORK.

MAGNETO-ELECTRIC MACHINE.

1,165,596.  Specification of Letters Patent.  Patented Dec. 28, 1915.

Application filed January 22, 1915. Serial No. 3,767.

*To all whom it may concern:*

Be it known that I, OTTO HEINS, a subject of the Emperor of Germany, residing in the city, county, and State of New York, have invented certain new and useful Improvements in Magneto-Electric Machines; and I do hereby declare the following to be a full, clear, and exact description of the invention, such as will enable others skilled in the art to which it appertains to make and use the same.

In small internal combustion engine installations, such, for example, as those designed to be attached to the stern of a rowboat or canoe, or to be placed in a small boat, it is customary to omit the reversing gearing, so that for backing out of slips or maneuvering at other times, it is necessary to reverse the engine itself. Thus, the magneto electric generator associated with the engine for igniting the combustible mixtures therein should be reversible. These engines usually have but one cylinder and are usually of the two cycle type requiring an ignition spark at each rotation. If the magneto is of the usual kind generating two ignition voltages in each rotation, its speed must be half that of the engine; but in order to be able to use a smaller magneto than would be required in that case, and also in order to reduce the cranking speed to a value easily attainable by hand in starting the engine from rest, I have found that it is preferable to rotate the magneto at engine speed and to sacrifice one of the two ignition voltages that the magneto is capable of producing in each rotation. Furthermore, in order that the engine will develop its power sufficiently at the different speeds ahead, and will develop its maximum power at its maximum speed ahead, the mechanical interrupter should be adjustable for advancing the ignition about 35° from that position at which the engine may be started ahead from rest without danger of back fire; and in order that the engine will develop a smaller amount of power efficiently for running in the reverse direction at a fair speed if desired, the mechanical interrupter should be adjustable for advancing the ignition about 20° from that position at which the engine may be started in backward rotation without danger of back fire. The requirement of reversibility and the requirement for advancing the ignition for both directions of rotation, combine to render the prior types of magneto electric generators unsuitable for the purpose, especially when it is desired to double the speed of rotation as aforesaid.

The object of the present invention is to provide a magneto electric generator fulfilling the foregoing requirements, and I attain this object in the preferred form of my invention in accordance with the following description taken in connection with the accompanying drawings, in which—

Figure 1 represents an elevation of the magneto with the cap removed to show the interrupter parts; Fig. 2 represents an elevation at right angles to Fig. 1, partly in section and partly broken away, particularly showing the interrupter parts and the collector segment and brush; Fig. 3 represents a section on line 3—3 of Fig. 2; and Figs. 4 to 12 are diagrams showing approximately the relation between the magnetic parts and the interrupter parts at different adjustments of the interrupter, wherein Figs. 4, 5 and 6 represent the extreme retarded position for backward propulsion, Figs. 7, 8 and 9 the running position for both directions of propulsion, and Figs. 10, 11 and 12 the extreme retarded position for forward propulsion.

Referring to Figs. 1 to 3, the field structure comprises a permanent magnet 1 and the soft iron pole pieces 2, the brass base 3 forming a stand for the magneto and the aluminum plates 4, 5 and 6 forming closures for the magnet. The rotatable armature is of the shuttle or I-form wherein the iron core 7 is wound with primary and secondary windings 8 in the usual way. One end of each winding is grounded, the insulated end of the primary winding being connected to the insulated electrode 9 of the mechanical interrupter, and the insulated end of the secondary winding being connected to the collector segment 10 which is adapted to periodically engage the collector brush 11 and thereby become connected to the insulated electrode of the spark plug in the wellknown way. The electrode 9 is mounted fast on the interrupter disk which rotates with the armature and collector segment, and the coöperative interrupter electrode 12 is pivoted on the disk so as to be grounded on the magneto structure and is normally held by the spring 13 in engagement with the electrode 9. The cam ring 14 having the adjusting lever 15 turns in the interrupter housing to adjust the period of ignition, and is provided with a series of depressions engaging the spring finger 16 to lightly hold the cam ring in a set position. The cam 17, herein termed the "short cam," is fast to the cam ring and is beveled off at both ends as shown. The cam 18, herein termed the "long cam," is also fast to the cam ring and has a beveled portion at each end, the center of this cam being diametrically opposite the high point of the cam 17. Upon rotation of the armature, the fiber block 19 periodically strikes the cam 17, and thereupon rocks the pivoted electrode 12 away from the electrode 9 to interrupt the circuit of the primary winding, the spring 13 engaging the co-operative electrodes to again close the circuit as the fiber block rides off the cam. Similarly the circuit of the primary winding is opened as the fiber block rides up the incline at the leading end of the cam 18, but in this case the cam holds the electrodes apart until the fiber block rides off the cam at the trailing end, the circuit being maintained open for a period which is a large part of the cycle compared with the period of open circuit produced by the short cam. The insulated brush 20 bears against a button mounted axially on the interrupter electrode 9 and short circuits the primary winding through the ground to cut out the ignition when the cam ring is turned until the brush bears on the screw 21, which is threaded into the stationary housing. The cap 22 is held closed over the interrupter parts by means of the pivoted leaf spring 23.

The manner in which the magneto is peculiarly adapted for developing an ignition spark at the spark plug in both directions of rotation when the interrupter is opened by the short cam at any position to which the interrupter is to be adjusted, and the manner in which the ignition spark at the spark plug is suppressed both when the circuit is opened and when closed by the long cam, irrespective of the direction of rotation and of the position of adjustment of the interrupter, will now be described, particularly in connection with Figs. 4 to 12.

For single-cylinder two-cycle engines, the magneto electric generator is geared to the engine to run at the same speed therewith and the gearing is so adjusted that the two have the proper angular relation. The mechanical interrupter is adjustable in both directions from a "running" position, that is, from a position wherein the short cam 17 engages the fiber block 19 when the armature poles 30 are approximately centered in the spaces between the pole faces 31, as indicated in Fig. 7. The range of adjustment for backward propulsion is from the position shown in Fig. 4 to the advanced position shown in Fig. 7, or 20°, and the range of adjustment for forward propulsion is from the retarded position shown in Fig. 10 to the advanced position shown in Fig. 7, or 35°, the direction of rotation of the magneto being indicated by the curved arrows. The armature core 7 and the pole faces 31 have approximately the relation shown in full lines in the diagrams when the fiber block 19, indicated therein by the straight arrow, engages the operating points of the cams 17 and 18.

The magnetic circuit is such that extending throughout the range of positions indicated by Figs. 7 and 10 for forward propulsion, there occurs in the waves of one sign a period of "maximum generation", that is, a period at any point of which the time rate of change of magnetic flux occurring upon interruption of the circuit of the primary winding is sufficient to generate in the secondary winding a satisfactory ignition voltage throughout the range of speed desired for the type of engine under consideration. Also, the magnetic circuit is such that extending throughout the range of positions indicated by Figs. 4 and 7 for backward propulsion, there occurs a period of maximum generation in waves of one sign. The short cam is positioned to interrupt the primary circuit in these periods, while the long cam in the running position is positioned to interrupt the primary circuit before the period of maximum generation in waves of the other sign and to close the primary circuit after the period of maximum generation in said waves (Figs. 8 and 9) in order that the voltage generated in the secondary winding is not sufficient at ordinary engine speed at either of these points to produce an igniting spark or to puncture the insulation of the armature winding. However, where fully retarded positions are necessary in either direction (Figs. 5, 6, 11 and 12) and for high engine speed, I prefer to provide additional means for assuredly eliminating an igniting spark at the spark plug in this period, for by so doing, I am enabled to decrease the length of the long cam and thereby increase the cyclic interval, or time interval at any speed, occurring between the point of closure of the primary circuit by the long cam when the fiber block rides off the trailing end thereof and the succeeding point of interruption by the short cam, the effect of which is explained hereinafter. The means which I prefer for assuredly suppressing the second spark comprises the collector segment 10 and the brush 11, the segment being of such angular extent, and the segment and brush being so positioned, that the two are engaged when the primary circuit is interrupted by the short cam, whatever may be its position in either direction of rotation, and also so that the two are disengaged when the primary circuit is interrupted or closed by the long cam in the running position and preferable at any position of adjustment. It is to be understood, however, that if desired the arrangement may be such that the segment and brush may be engaged when the interrupter is open or closed by the long cam in any position provided that the point occurs outside of the period wherein an igniting spark may be produced at the spark plug.

By decreasing the length of the long cam as noted above, and thereby increasing the cyclic interval occurring between the point of closure by the long cam and the succeeding point of interruption by the short cam, I am enabled to make proper allowance for the time lag of the magnetic circuit and particularly of the permanent magnet 1 and pole piece 2 constituting the field structure of the magneto. If this were not done, sufficient time might not occur, especially at high speed, for the magnetic flux to build up its maximum value at the point of interruption by the short cam, and as a result, the voltage generated at that time would not be sufficient to produce a satisfactory ignition spark at the spark plug. On the other hand, if the length of the long cam were materially decreased, so that the point of interruption by the long cam occurred substantially 180° prior to the interruption by the short cam, the voltage generated might be high enough to puncture the insulation of the armature winding or to provide an ignition spark at the spark plug if the collector and brush were engaged at the time. And furthermore, if the long cam were omitted entirely, the voltage generated at the interruption by the short cam might not be sufficient for satisfactory ignition, especially at high speed, owing to the fact that the permanent field would be temporarily weakened by the reaction of the uninterrupted current flowing in the primary winding during waves of the other sign and would not recover its normal intensity in time. In the magneto herein shown, the angular space of the long cam between the operative points is approximately 100°. The width of the fiber block 19 is such that the striking points of the short cam 17 in the two directions of rotation are separated by about 14°, that is, the cyclic point of interruption in one direction of rotation is separated from the cyclic point of interruption in the other direction of rotation by about 14° for any one position of adjustment of the interrupter. In order to cover this contingency in providing a reversible magneto electric generator capable of generating a satisfactory ignition voltage throughout the desired range of adjustment of the interrupter and throughout the desired range of speed, the field poles 2 are undercut at each side of each pole face 31 and preferably the angular extent A of each undercut portion is equal to about the angular separation of the striking points of the short cam in the two directions of rotation. Furthermore, in order to attain the most satisfactory sparking voltages under the conditions, I prefer to make the angular span B of an armature pole 30 such that A is about equal to half the difference between C and B, wherein C is the angular space between the pole faces 31, as indicated in Fig. 3. In the machine shown herein, the angular space C between the pole faces exceeds the angular span B of an armature pole by about 28°, A being 17°; also the undercut portions have a depth of about 3 millimeters. It has been found that in this way the voltage wave produced by the magneto has an extended or flattened peak so that the period of maximum generation more effectively covers the range through which the interrupter may be adjusted from the running position for either direction of rotation.

It will be observed that the fully advanced position of adjustment of the interrupter for the two directions of rotation is the same, to wit, at the running position. Thus, for small engines, it is generally unnecessary to change the adjustment for running in the reverse direction, and even in starting the engine from rest, one way or the other, the interrupter may still be at the running position, provided that the effect of back fire is not too severe for the operator to overcome easily.

Having thus described my invention, what I claim is:

1. In a reversible magneto electric generator, the combination with the field structure and rotatable armature thereof, of a mechanical interrupter having a short cam which is positioned for both directions of rotation to interrupt the circuit of the armature winding during the period of maximum generation in waves of one sign, and also having a long cam which, in its running position, is positioned for both directions of rotation to interrupt said circuit prior to the period of maximum generation in waves of the other sign, the long cam being designed to provide a cyclic interval, during which said circuit is closed, sufficient for the attainment of the maximum generation at the point of interruption produced by the short cam; substantially as and for the purpose described.

2. In a reversible magneto electric generator, the combination with the field structure and rotatable armature thereof, of a mechanical interrupter having a short cam which, in its running position, is positioned for both directions of rotation to interrupt the circuit of the armature winding during the period of maximum generation in waves of one sign, and also having a long cam which, in its running position, is positioned for both directions of rotation to interrupt said circuit prior to the period of maximum generation in waves of the other sign, and also to close said circuit after said latter period; substantially as and for the purpose described.

3. In a reversible magneto electric generator, the combination with the field structure and rotatable armature thereof, of an adjustable mechanical interrupter having a short cam which is positioned for both directions of rotation and for any adjustment to interrupt the circuit of the armature winding during the period of maximum generation in waves of one sign, and also having a long cam which, in its running position, is positioned for both directions of rotation to interrupt said circuit prior to the period of maximum generation in waves of the other sign, and also to close said circuit after said latter period; substantially as and for the purpose described.

4. In a reversible magneto electric generator, the combination with the rotatable armature and a field structure having undercut pole faces, of an adjustable mechanical interrupter having one cam positioned for both directions of rotation to interrupt the circuit of the armature winding during the period of maximum generation in waves of one sign, and also having a second cam positioned to interrupt said circuit in waves of the other sign, the striking points of the first mentioned cam in the two directions of rotation being separated by an angle about equal to the angular extent of an undercut portion at one end of a pole face; substantially as and for the purpose described.

5. In a reversible magneto electric generator, the combination with the rotatable armature and a field structure having undercut pole faces, of an adjustable mechanical interrupter having a short cam positioned for both directions of rotation to interrupt the circuit of the armature winding during the period of maximum generation in waves of one sign, and also having a long cam which, in its running position, is positioned for both directions of rotation to interrupt said circuit prior to the period of maximum generation in waves of the other sign, and also to close said circuit after said latter period, the striking points of the short cam in the two directions of rotation being separated by an angle about equal to the angular extent of an undercut portion at one end of a pole face; substantially as and for the purpose described.

6. In a reversible magneto electric generator, the combination with the rotatable armature and a field structure having undercut pole faces, of an adjustable mechanical interrupter having one cam positioned for both directions of rotation to interrupt the circuit of the armature winding during the period of maximum generation in waves of one sign, and also having a second cam positioned to interrupt said circuit in waves of the other sign, the angular extent of an undercut portion at one end of a pole face being equal to about half the angle representing the difference between the angular space between pole faces and the angular span of an armature pole; substantially as and for the purpose described.

7. In a reversible magneto electric generator, the combination with the rotatable armature and a field structure having undercut pole faces, of an adjustable mechanical interrupter having a short cam positioned for both directions of rotation to interrupt the circuit of the armature winding during the period of maximum generation in waves of one sign, and also having a long cam which, in its running position, is positioned for both directions of rotation to interrupt said circuit prior to the period of maximum generation in waves of the other sign, and also to close said circuit after said latch period, the angular extent of an undercut portion at one end of a pole face being equal to about half the angle representing the difference between the angular space between pole faces and the angular span of an armature pole; substantially as and for the purpose described.

8. In a reversible magneto electric generator, the combination with the field structure, the rotatable armature having primary and secondary windings, and the collector segment connected to the secondary winding and adapted to engage the collector brush, of an adjustable mechanical interrupter having one cam which is positioned for both directions of rotation and for any position of adjustment to interrupt the circuit of the primary winding during the period of maximum generation in waves of one sign, and also having a second cam which, in its running position, is positioned for both directions of rotation to interrupt said circuit prior to the period of maximum generation in waves of the other sign, the collector segment being designed to engage the brush when the first mentioned cam interrupts said circuit and to be disengaged from the brush when the second mentioned cam interrupts said circuit in its running position; substantially as and for the purpose described.

9. In a reversible magneto electric generator, the combination with the field structure, the rotatable armature having primary and secondary windings, and the collector segment connected to the secondary winding and adapted to engage the collector brush, of an adjustable mechanical interrupter having a short cam which is positioned for both directions of rotation and for any adjustment to interrupt the circuit of the primary winding during the period of maximum generation in waves of one sign, and also having a long cam which, in its running position, is positioned to interrupt said circuit prior to the period of maximum generation in waves of the other sign, and also to close said circuit after said latter period, the collector segment being designed to engage the brush when the short cam interrupts said circuit and to be disengaged from the brush while the long cam holds said circuit open at any position of adjustment; substantially as and for the purpose described.

In testimony whereof I affix my signature, in presence of two witnesses.

OTTO HEINS.

Witnesses:
A. H. D. ALTREE,
ROLF LINDENHAYN.

---

Corrections in Letters Patent No. 1,165,596.

It is hereby certified that in Letters Patent No. 1,165,596, granted December 28, 1915, upon the application of Otto Heins, of New York, N. Y., for an improvement in "Magneto-Electric Machines," errors appear in the printed specification requiring correction as follows: Page 3, line 24, after the word "up" insert the word *to;* page 4, line 91, claim 7, for the word "latch" read *latter;* and that the said Letters Patent should be read with these corrections therein that the same may conform to the record of the case in the Patent Office.

Signed and sealed this 25th day of January, A. D., 1916.

[SEAL.]

R. F. WHITEHEAD,

*Acting Commissioner of Patents.*

Cl. 123—149.